(12) United States Patent
Shin et al.

(10) Patent No.: US 11,917,273 B2
(45) Date of Patent: Feb. 27, 2024

(54) IMAGE GENERATING DEVICE AND METHOD THEREOF

(71) Applicant: SAMSUNG ELECTRONICS CO., LTD., Suwon-si (KR)

(72) Inventors: Seunghak Shin, Suwon-si (KR); Jaeyun Jeong, Suwon-si (KR); Gipyo Kim, Suwon-si (KR); Seokyeol Kim, Suwon-si (KR); Songhyeon Kim, Suwon-si (KR); Haekyung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 17/435,981

(22) PCT Filed: Aug. 30, 2021

(86) PCT No.: PCT/KR2021/011606
§ 371 (c)(1),
(2) Date: Sep. 2, 2021

(87) PCT Pub. No.: WO2022/050646
PCT Pub. Date: Mar. 10, 2022

(65) Prior Publication Data
US 2023/0164406 A1    May 25, 2023

(30) Foreign Application Priority Data
Sep. 2, 2020    (KR) .................. 10-2020-0111678

(51) Int. Cl.
*H04N 23/45*    (2023.01)
*G06T 7/55*    (2017.01)
(Continued)

(52) U.S. Cl.
CPC .......... *H04N 23/45* (2023.01); *G01S 7/4865* (2013.01); *G01S 7/4915* (2013.01); *G01S 17/89* (2013.01);
(Continued)

(58) Field of Classification Search
CPC ........ H04N 23/45; H04N 23/56; H04N 23/55; G06T 7/55; G06T 7/521; G01S 7/4865; G01S 7/4915; G01S 17/89
See application file for complete search history.

(56) References Cited

U.S. PATENT DOCUMENTS 8,894,216 B2    11/2014    Reichow et al.
10,024,965 B2    7/2018    Nehmadi et al.
(Continued)

FOREIGN PATENT DOCUMENTS

KR    10-1099648 B1    12/2011
KR    10-2015-0037203 A    4/2015
(Continued)

OTHER PUBLICATIONS

International Search Report and Written Opinion dated Nov. 29, 2021 issued by the International Searching Authority in International Application No. PCT/KR2021/011606 (PCT/ISA/220, PCT/ISA/210, and PCT/ISA/237).
(Continued)

*Primary Examiner* — Girumsew Wendmagegn
(74) *Attorney, Agent, or Firm* — Sughrue Mion, PLLC

(57) ABSTRACT

An image generating device, a method and a computer-readable recording medium are provided. The image generating device includes a passive sensor, an active sensor, a mask forming unit, a memory storing at least one instruction, and a processor configured to execute the at least one instruction to obtain a first depth map with respect to a first space by using the passive sensor, identify an unidentified
(Continued)

region of the first depth map, obtain a second depth map with respect to the unidentified region by using the active sensor and the mask forming unit configured to form a mask based on the unidentified region, and obtain a third depth map with respect to the first space based on the first depth map and the second depth map.

15 Claims, 12 Drawing Sheets

(51) Int. Cl.
    *G06T 7/521*     (2017.01)
    *H04N 23/56*     (2023.01)
    *H04N 23/55*     (2023.01)
    *G01S 7/4865*     (2020.01)
    *G01S 7/4915*     (2020.01)
    *G01S 17/89*     (2020.01)

(52) U.S. Cl.
    CPC ............... *G06T 7/521* (2017.01); *G06T 7/55* (2017.01); *H04N 23/55* (2023.01); *H04N 23/56* (2023.01)

(56) References Cited

U.S. PATENT DOCUMENTS

| | | | |
|---|---|---|---|
| 10,091,494 | B2 | 10/2018 | Romano et al. |
| 10,404,969 | B2 | 9/2019 | Lindner et al. |
| 10,462,446 | B2 | 10/2019 | Varekamp et al. |
| 10,564,389 | B2 | 2/2020 | Jeong |
| 11,372,104 | B2 | 6/2022 | Kim et al. |
| 2016/0212411 | A1* | 7/2016 | Lindner ............... G06T 7/593 |
| 2017/0289515 | A1 | 10/2017 | Li et al. |
| 2019/0333237 | A1 | 10/2019 | Javidnia et al. |

FOREIGN PATENT DOCUMENTS

| | | |
|---|---|---|
| KR | 10-2017-0106325 A | 9/2017 |
| KR | 10-2017-0131134 A | 11/2017 |
| KR | 10-2018-0097684 A | 8/2018 |
| KR | 10-2019-0034980 A | 4/2019 |

OTHER PUBLICATIONS

Cui et al., "Polarimetric Multi-View Stereo," CVF, (10 total pages).

"3D sensing for mobile," ams designs and manufactures unique lighting solutions for a variety of 3D sending applications, AMS, OSRAM, (3 total pages).

Singh-Gasson et al., "Maskless fabrication of light-directed oligo-nucleotide microarrays using a digital micromirror array," Nature America Inc., Nature Biotechnology vol. 17, Jul. 28, 1999, (5 total pages).

Zhang et al., "GA-Net: Guided Aggregation Net for End-to-end Stereo Matching," CVF, (10 total pages).

Han et al., "A review of algorithms for filtering the 3D point cloud," Signal Processing: Image Communication 57, Elsevier, May 15, 2017, (10 total pages).

Duan et al., "Weighted Multi-projection: 3D Point Cloud Denoising with Estimated Tangent Planes," Jul. 1, 2018, (6 total pages).

\* cited by examiner

IMAGE GENERATING DEVICE AND METHOD THEREOF

TECHNICAL FIELD

The disclosure relates generally to an image generating device and a method thereof.

BACKGROUND ART

In order to model a three-dimensional space, depth information regarding the corresponding space is required. To obtain such depth information, depth cameras employing a time-of-flight (ToF) scheme are used. The depth camera may obtain depth information corresponding to a distance between an object in a captured space and the depth camera.

There is a growing interest in spatial augmentation technology in which three-dimensional interaction elements are added to a technology field such as augmented reality (AR). The core of the spatial augmentation technology is three-dimensional space modeling using a depth camera. By using the spatial augmentation technology, three-dimensionalized real-world elements objects may have three-dimensional position information in a space and interact with a virtual object.

DESCRIPTION OF EMBODIMENTS

Technical Problem

Provided are an image generating device capable of obtaining a depth map with respect to a space by using a passive sensor and an active sensor in order to model a space including environments from which features are difficult to extract, such as a single-color region or a plain-pattern region, and a method thereof.

Technical Solution to Problem

In accordance with an aspect of the disclosure, there is provided an image generating device that may include a passive sensor, an active sensor, a mask forming unit, a memory storing at least one instruction, and a processor configured to execute the at least one instruction to obtain a first depth map with respect to a first space by using the passive sensor, identify an unidentified region of the first depth map, obtain a second depth map with respect to the unidentified region by using the active sensor and the mask forming unit configured to form a mask based on the unidentified region, and obtain a third depth map with respect to the first space based on the first depth map and the second depth map.

In accordance with an aspect of the disclosure, there is provided a method of generating an image that may include obtaining a first depth map with respect to a first space by using a passive sensor; identifying an unidentified region of the first depth map; obtaining a second depth map with respect to the unidentified region by using an active sensor and a mask forming unit configured to form a mask based on the unidentified region; and obtaining a third depth map with respect to the first space based on the first depth map and the second depth map.

In accordance with an aspect of the disclosure, there is provided a non-transitory computer-readable recording medium having recorded thereon a program that is executed by a computer to perform a method of generating an image, the method may include obtaining a first depth map with respect to a space by using a passive sensor; obtaining a second depth map with respect to the unidentified region by using an active sensor and a mask forming unit configured to form a mask based on the unidentified region; and obtaining a third depth map with respect to the space based on the first depth map and the second depth map.

MODE OF DISCLOSURE

Figure 1:
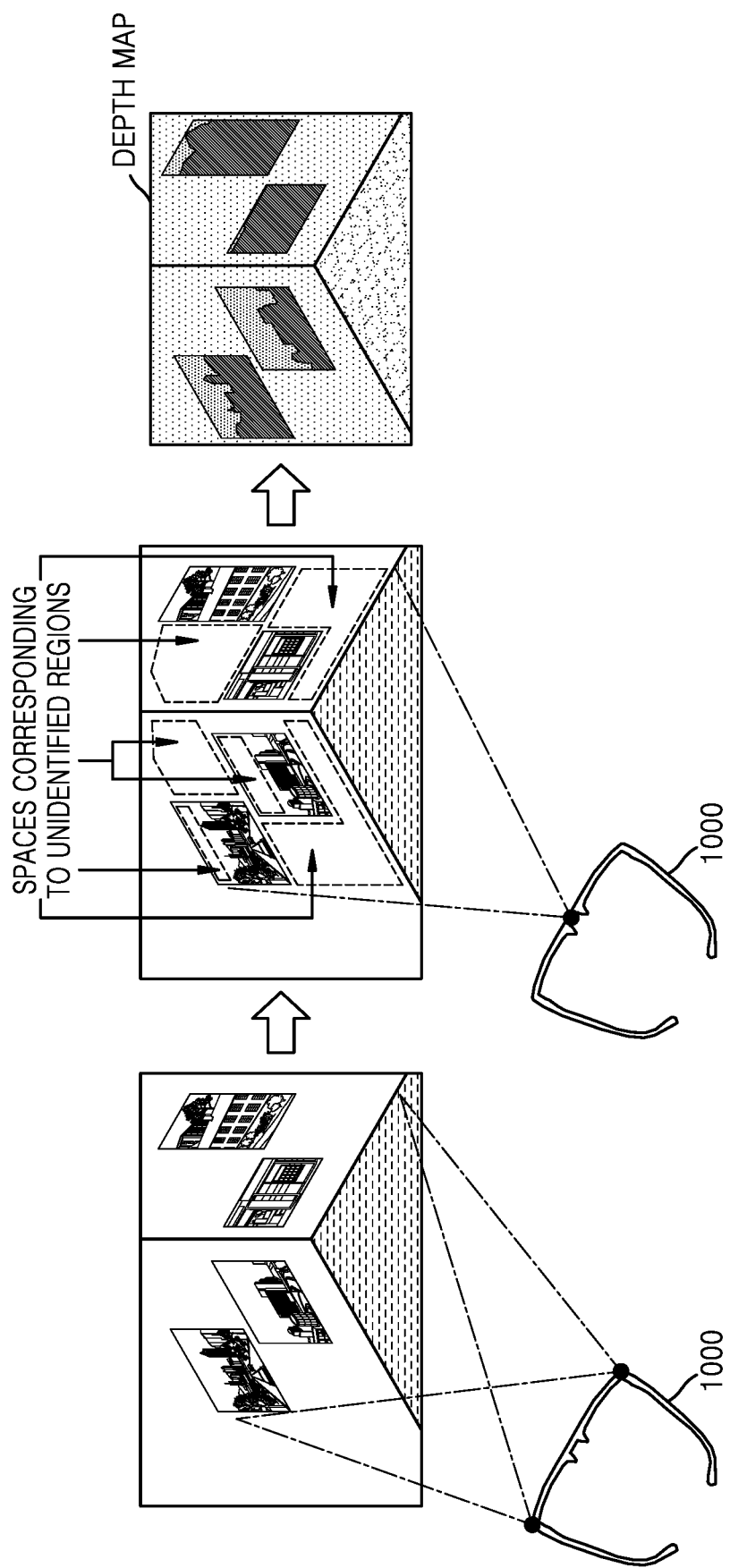
FIG. 1 is a diagram illustrating a process of generating a depth map according to embodiments of the disclosure.

Throughout the disclosure, the expression "at least one of a, b or c" indicates only a, only b, only c, both a and b, both a and c, both b and c, or all of a, b, and c.

Hereinafter, embodiments of the disclosure will now be described in detail with reference to the accompanying drawings for those of skill in the art to be able to perform the disclosure without any difficulty. The disclosure may be embodied in many different forms and should not be construed as being limited to the embodiments of the disclosure set forth herein.

Throughout the specification, when a part "includes" an element, it is to be understood that the part may additionally include other elements rather than excluding other elements as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

In addition, although the terms such as "first" or "second" may be used herein to describe various elements, these elements should not be limited by these terms. These terms are only used to distinguish one element from another element.

The embodiments of the disclosure relate to an apparatus and a method for generating an image, and detailed descriptions thereof will be omitted with respect to matters widely known to those of skill in the art.

The term "image generating device" used herein may collectively refer to electronic devices capable of generating an image. The image generating device may generate not only an image of a scene including an object, but also a depth map containing depth information regarding a space including the object. The image generating device may be an augmented reality device, a smart phone, a digital camera, or the like.

The term "passive sensor" may refer to a device capable of detecting phenomena such as heat, vibration, light, radiation, etc., from a subject and obtaining corresponding information as an input. For example, a stereo camera, a mono camera, an infrared sensor, a pan/tilt camera, and the like, which operate without emitting a light, a pulse, or the like, may be referred to as a passive sensor.

The term "active sensor" may refer to a device, including a source, that is capable of emitting a light source, lighting, a pulse, or the like to a subject, and that is capable of receiving information reflected from the subject. Unlike the passive sensor, the active sensor is equipped with its own light source, and thus may actively emit the light source to a subject, and measure back scattering that arrives at the active sensor from the subject. For example, a ToF sensor, which emits a laser or an infrared ray to a subject and calculates a time taken by the laser or infrared ray to be returned, a laser sensor, a microwave sensor, a structured-light sensor which emits certain patterned light and calculates a distance from the size or shape of an image formed on a subject, an invertible light sensor, or the like may be referred to as an active sensor.

FIG. 1 is a diagram illustrating a process of generating a depth map according to embodiments of the disclosure.

An image generating device 1000 may generate a depth map that provides depth information regarding a space for modeling a three-dimensional space. The depth map may be obtained by using a passive sensor and/or an active sensor.

A depth map generating scheme using a passive sensor may obtain a depth map by performing feature point matching, stereo matching, or the like, based on data regarding a space obtained by using the passive sensor. A depth map generating scheme using an active sensor may obtain a depth map based on information regarding a space obtained by using a light-emitting unit that emits light to a subject and a light-receiving unit that receives information reflected from the subject.

Because the depth map generating scheme using a passive sensor employs matching between feature points, it may be difficult to produce a three-dimensional image in an environment difficult to extract the feature points. On the other hand, in the depth map generating scheme using an active sensor, the power consumption is high due to the operation of the source, and when using a light source, a light pattern that occurs due to emitted light may disturb processing of an algorithm of, for example, estimating the position of the sensor. Therefore, hereinafter, a method in which the image generating device 1000 generates a depth map by using both the passive sensor and the active sensor, in order to solve a battery issue caused by the power consumption and perform three-dimensional space modeling on spaces of various environments, will be described.

For convenience of description, FIG. 1 illustrates an example in which the image generating device 1000 is an augmented reality glasses device which uses a stereo camera as a passive sensor and a ToF sensor as an active sensor, but the types of the passive sensor, the active sensor, and the image generating device 1000 are not limited to the example illustrated in FIG. 1. As illustrated in FIG. 1, in the case where the image generating device 1000 is an augmented reality glasses device, the stereo camera may be at a portion, to face forward, where a glasses frame that supports each lens unit and temples for mounting the image generating device 1000 on a user's face are in contact with each other, and the ToF sensor may be embedded in a bridge frame connecting a left-eye lens unit with a right-eye lens unit, but the disclosure is not limited thereto.

FIG. 1 illustrates that the image generating device 1000 generates a depth map by using the passive sensor and the active sensor.

The image generating device 1000 may first generate a depth map with respect to a space (hereinafter, referred to as the first depth map) by using the passive sensor. The image generating device 1000 may generate a first depth map with respect to the space by using the stereo cameras that are at corners of both sides of the glasses frame supporting each of the left-eye lens unit and the right-eye lens unit. However, as described above, in the case where the space includes an environment from which it is difficult to extract feature points, for example, in the case where the space includes a single-color region or a plain-pattern region, the image generating device 1000 may be unable to generate a depth map with respect to a portion corresponding to the single-color region or the plain-pattern region in the space by using the depth map generating scheme using a passive sensor. In this case, the first depth map generated by using the passive sensor includes a region where the depth information of which is unknown, i.e., an unidentified region.

Figure 2:
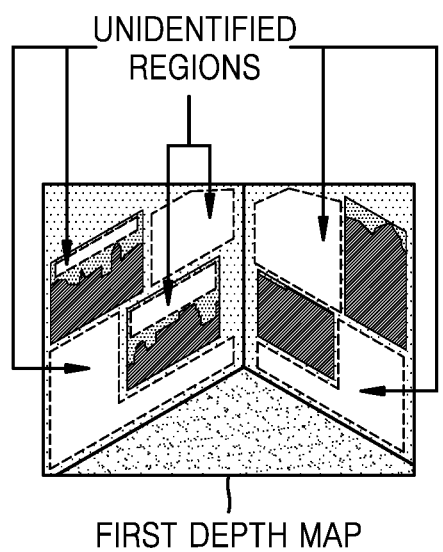
FIG. 2 is a diagram illustrating unidentified regions identified in a first depth map, according to an embodiment of the disclosure.

FIG. 2 is a diagram illustrating unidentified regions identified in the first depth map, according to an embodiment of the disclosure.

Referring to FIG. 2, the first depth map generated by using the passive sensor is illustrated, and unidentified regions, depth information of which is unknown, are present in the first depth map. In the disclosure, the unidentified regions may include a region of which depth information is unknown, or a region where the accuracy of depth information is less than or equal to a preset level, in the first depth map.

The image generating device 1000 may generate the first depth map by using data obtained from the passive sensor as an input for a depth map generation algorithm. In this case, the image generating device 1000 may identify, as an unidentified region, a region, depth information of which is unknown, or the accuracy of the depth information of which is less than or equal to the preset level, in the generated first depth map. The image generating device 1000 may store information about the identified unidentified region in a memory.

Referring again to FIG. 1, the image generating device 1000 may use the active sensor to generate a depth map (hereinafter, referred to as the second depth map) with respect to the unidentified region of the first depth map. In this case, according to an implementation method of the image generating device 1000, the image generating device 1000 may selectively project light emitted from a light source of the active sensor to a space corresponding to the unidentified region in the entire space or may project the light to the entire space. For example, the image generating device 1000 may generate a second depth map based on information received by the active sensor in response to the selectively projecting of the light emitted from the light source of the active sensor to the space corresponding to the unidentified region. For another example, the image generating device 1000 may generate the second depth map based on information corresponding to the unidentified region of the first depth map among information received by the active sensor in response to the projecting of the light emitted from the light source of the active sensor to the entire space.

The image generating device 1000 may generate a depth map (hereinafter, referred to as the third depth map) that provides depth information regarding the entire space, based on the first depth map and the second depth map. The image generating device 1000 may generate the third depth map with respect to the space by supplementing the unidentified region of the first depth map by using the second depth map.

Hereinafter, a method of generating a depth map with the image generating device 1000 according to an embodiment of the disclosure will be described in detail.

Figure 3:
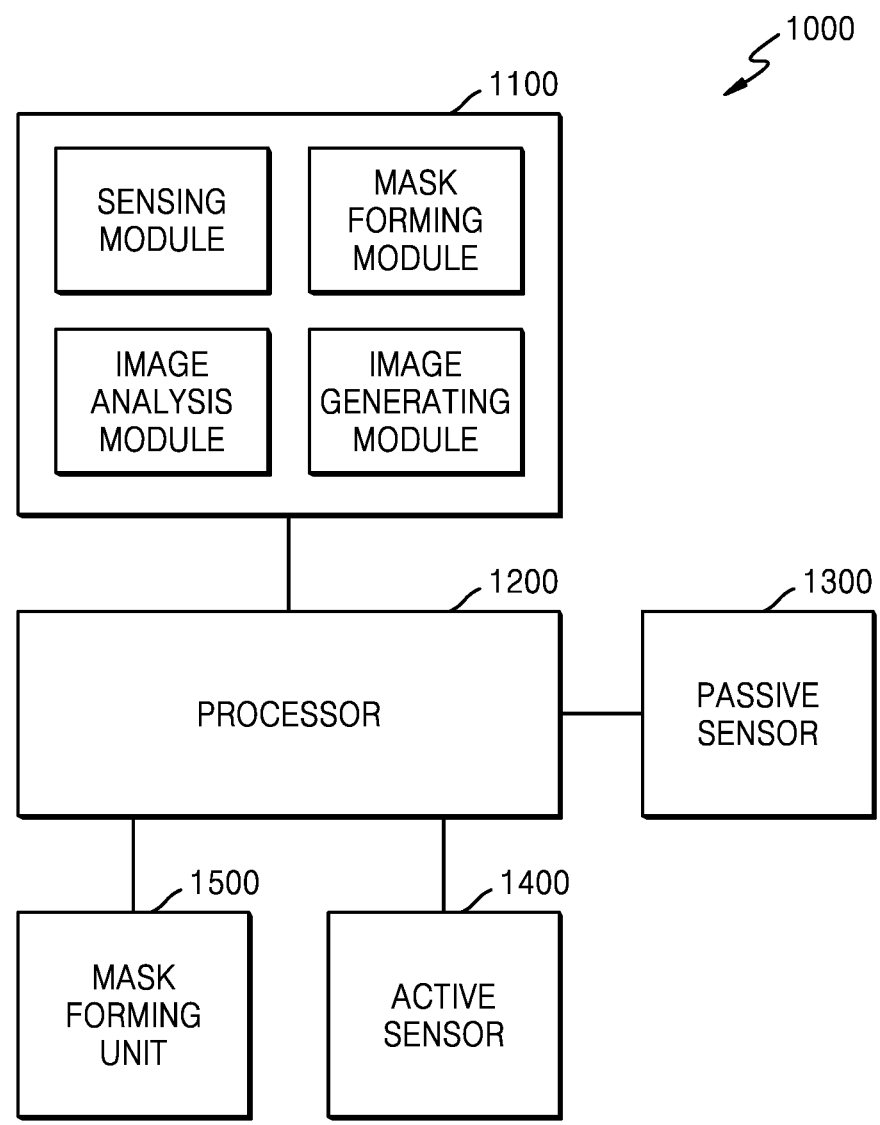
FIG. 3 is a diagram illustrating a configuration and an operation of an image generating device, according to an embodiment of the disclosure.

FIG. 3 is a diagram illustrating a configuration and an operation of the image generating device 1000, according to an embodiment of the disclosure.

Referring to FIG. 3, the image generating device 1000 may include a memory 1100, a processor 1200, a passive sensor 1300, an active sensor 1400, and a mask forming unit 1500. The image generating device 1000 may further include other general-purpose components in addition to the components illustrated in FIG. 3 as will be understood by those of skill in the art from the description herein.

The memory 1100 may store instructions executable by the processor 1200. The memory 1100 may store a program including instructions. The memory 1100 may include, for example, at least one type of hardware device among random-access memory (RAM), static random-access memory (SRAM), read-only memory (ROM), flash memory, electrically erasable programmable read-only memory (EEPROM), programmable read-only memory (PROM), magnetic memory, a magnetic disk, and/or an optical disk.

The memory 1100 may store at least one software module including instructions. Each software module is executed by the processor 1200 to cause the image generating device 1000 to perform a certain operation or function. For example, as illustrated in FIG. 3, the memory 1100 may store a sensing module, an image analysis module, a mask forming module, and an image generating module, but is not limited thereto, and may store some of them or may further include another software module.

The processor 1200 may control an operation or a function performed by the image generating device 1000 by executing the instructions or a programmed software module stored in the memory 1100. The processor 1200 may include a hardware component that performs arithmetic operations, logic operations, input/output operations, and signal processing.

The processor 1200 may include at least one processing module. The processor 1200 may include, for example, at least one of a central processing unit (CPU), a microprocessor, a graphics processing unit (GPU), an application-specific integrated circuit (ASIC), a digital signal processor (DSP), a digital signal processing device (DSPD), a programmable logic device (PLD), and/or a field programmable gate array (FPGA), but is not limited thereto.

The passive sensor 1300 and the active sensor 1400 may be various types of devices that may be used to generate a depth map. For example, the passive sensor 1300 may be a mono camera because images with respect to a space may be obtained by using the mono camera, depth information regarding the space may be measured according to a deep learning analysis using a depth information estimation model, and a depth map based on the measured depth information may be generated. The active sensor 1400 may be a structured-light sensor capable of emitting certain patterned light to obtain depth information from the size or shape of an image formed on a subject. However, for convenience of description, the case where the passive sensor 1300 is a stereo camera and the active sensor 1400 is a ToF sensor will be described as an example.

The passive sensor 1300 may include a first camera and a second camera that are respectively provided at certain portions of the image generating device 1000. The image generating device 1000 may detect, from images respectively obtained by the first camera and the second camera, feature points corresponding to each other, based on a stereo vision scheme using a position difference between the first camera and the second camera as a baseline, measure depth information regarding the space by calculating a disparity which is an index of depth information at the feature points, and generate the first depth map based on the measured depth information.

The active sensor 1400 may be a ToF sensor. The ToF sensor projects an infrared ray or light, measures a time taken by the infrared ray or light to be reflected from an object and returned, or uses a phase difference of the infrared ray or light before and after the reflection, and may include an emitter including at least one light source for projecting an infrared ray or light. The image generating device 1000 may identify the unidentified region of the first depth map, and generate the second depth map with respect to the unidentified region by using the ToF sensor.

The mask forming unit 1500 may form a mask based on the unidentified region. The mask forming unit 1500 may include a plurality of optical elements which are selectively operable to pass or block the light emitted from the light source of the active sensor 1400, so as to project the light to the space corresponding to the unidentified region of the first depth map. Each optical element of the plurality of optical elements may operate as an optical shutter that may be controlled so that the light, emitted from the light source of the active sensor 1400, that passes through or is blocked by each optical element is projected to the space corresponding to the unidentified region of the first depth map. Each of the plurality of optical elements of the mask forming unit 1500 may be a liquid crystal cell or a reflective member, such as a micromirror. The light transmittance of the liquid crystal cell may be changed according to a voltage applied. The micromirror may change the path of light as it rotates.

The mask forming unit 1500 may operate such that an optical element corresponding to the unidentified region of the first depth map passes the emitted light, and an optical element corresponding to a region other than the unidentified region of the first depth map blocks (or reflects) the emitted light. In other words, the mask forming unit 1500 may operate such that the optical element corresponding to the unidentified region forms an unmasked region, and then optical element corresponding to the region other than the unidentified region in the first depth map forms a masked region.

Figure 4:
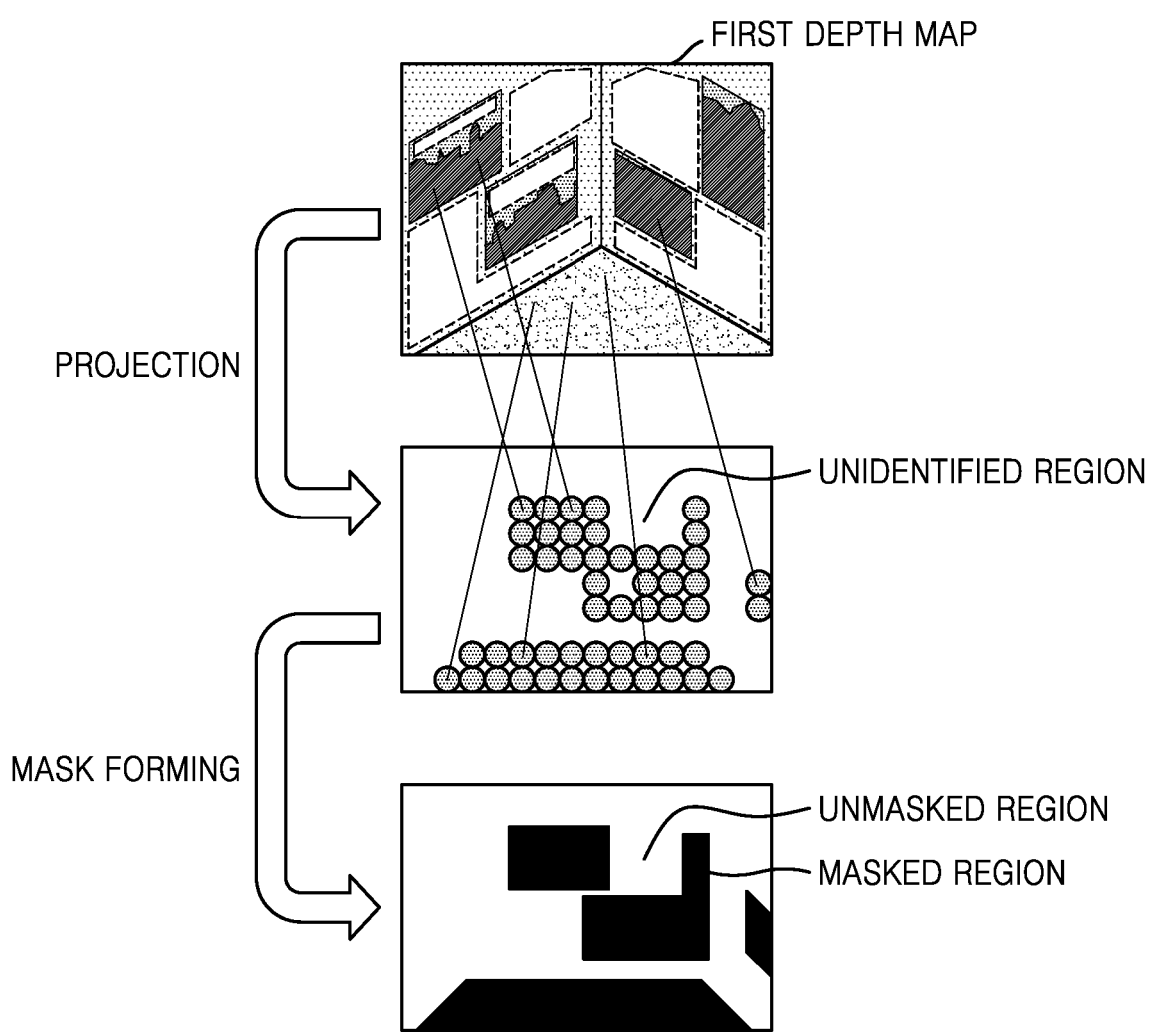
FIG. 4 is a diagram illustrating a process of forming a mask by an image generating device, according to an embodiment of the disclosure.

FIG. 4 is a diagram illustrating a process of forming a mask by the image generating device 1000, according to an embodiment of the disclosure.

Referring to FIG. 4, the unidentified regions are included in the first depth map generated by the image generating device 1000 by using the passive sensor 1300. The image generating device 1000 may obtain an image obtained by projecting the first depth map including the unidentified regions onto a light-emitting surface of the active sensor 1400. In the projected image, a portion to which depth information of the first depth map is projected may be a masked region, and a portion to which the depth information of the first depth map is not projected may be an unmasked area. As a result, the image generating device 1000 may control the mask forming unit 1500 to form a mask based on the unidentified region according to the image obtained by projecting the first depth map onto the light-emitting surface of the active sensor 1400.

Referring again to FIG. 3, the mask forming unit 1500 may include various types of optical elements to pass or block the light emitted from the light source of the active sensor 1400.

For example, in the case where the plurality of optical elements of the mask forming unit 1500 are configured in the form of a micromirror array, each micromirror may be rotated by a programmed angle based on the unidentified region to integrate the light emitted from the light source into the space corresponding to the unidentified region. By using an effect of integrating light, the active sensor 1400 may operate the light source with low power or low power consumption.

For another example, in the case where the plurality of optical elements of the mask forming unit 1500 includes liquid crystal cells, a voltage of a programmed voltage magnitude may be applied to each of the liquid crystal cells based on the unidentified region to adjust the light transmittance, and thus selectively pass part of light emitted from a single light source or selectively pass light emitted from an operating light source among a plurality of light sources.

Figure 5:
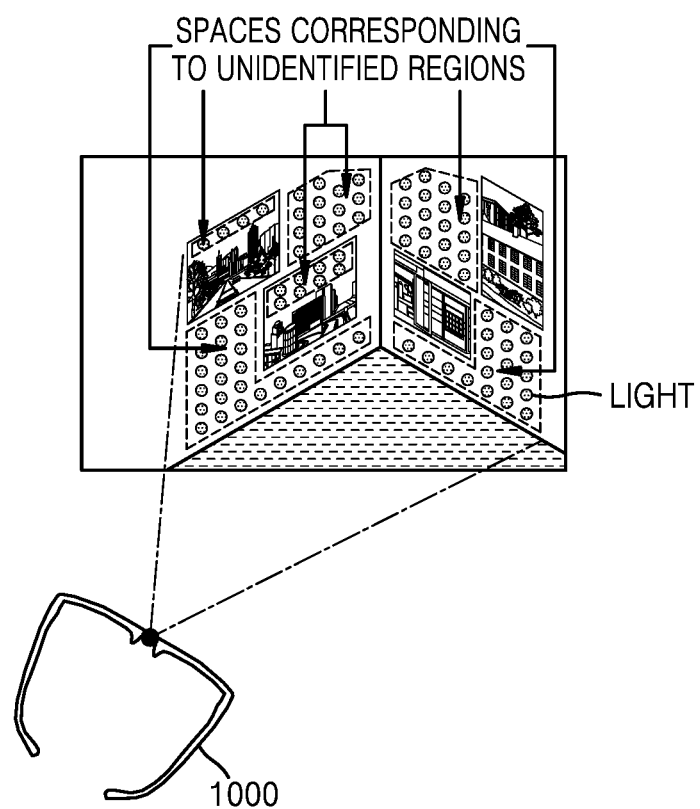
FIG. 5 is a diagram illustrating a process of generating, by an image generating device, a second depth map with respect to an unidentified region, according to an embodiment of the disclosure.

FIG. 5 is a diagram illustrating a process of generating, by the image generating device 1000, the second depth map with respect to the unidentified regions, according to an embodiment of the disclosure.

The image generating device 1000 may generate the second depth map with respect to the unidentified regions of the first depth map by using the active sensor 1400 and the mask forming unit 1500. As described above, the mask forming unit 1500 may selectively project the light emitted from the light source of the active sensor 1400 to the space corresponding to the unidentified region of the first depth map.

Referring to FIG. 5, the image generating device 1000 may control the mask forming unit 1500 to selectively project the light emitted from the light source of the active sensor 1400 to the space corresponding to the unidentified region of the first depth map among the entire space. Since the image generating device 1000 has identified the unidentified regions of the first depth map and has been storing the information about the identified unidentified regions in the memory 1100, the image generating device 1000 may selectively project the light to the space corresponding to the unidentified region based on the stored information.

The image generating device 1000 may actively emit the light to the space corresponding to the unidentified region by using the active sensor 1400 and the mask forming unit 1500, and detect reflected light that is reflected from the subject and then received by the active sensor 1400. The image generating device 1000 may use the active sensor 1400 that may obtain the depth information by emitting a laser or an infrared ray to the space corresponding to the unidentified region and calculating a time taken by the laser or infrared ray to be returned, or by emitting certain patterned light to the space corresponding to the unidentified region and measuring the size or shape of an image formed at the corresponding space. Since the image generating device 1000 may be unable to obtain depth information regarding a space corresponding to a single-color region or a plain-pattern region by using the passive sensor 1300, the image generating device 1000 generates the second depth map with respect to the unidentified region by using the active sensor 1400 and the mask forming unit 1500.

The mask forming unit 1500 may operate differently depending on whether the active sensor 1400 includes a single light source or a plurality of light sources.

Figure 6:
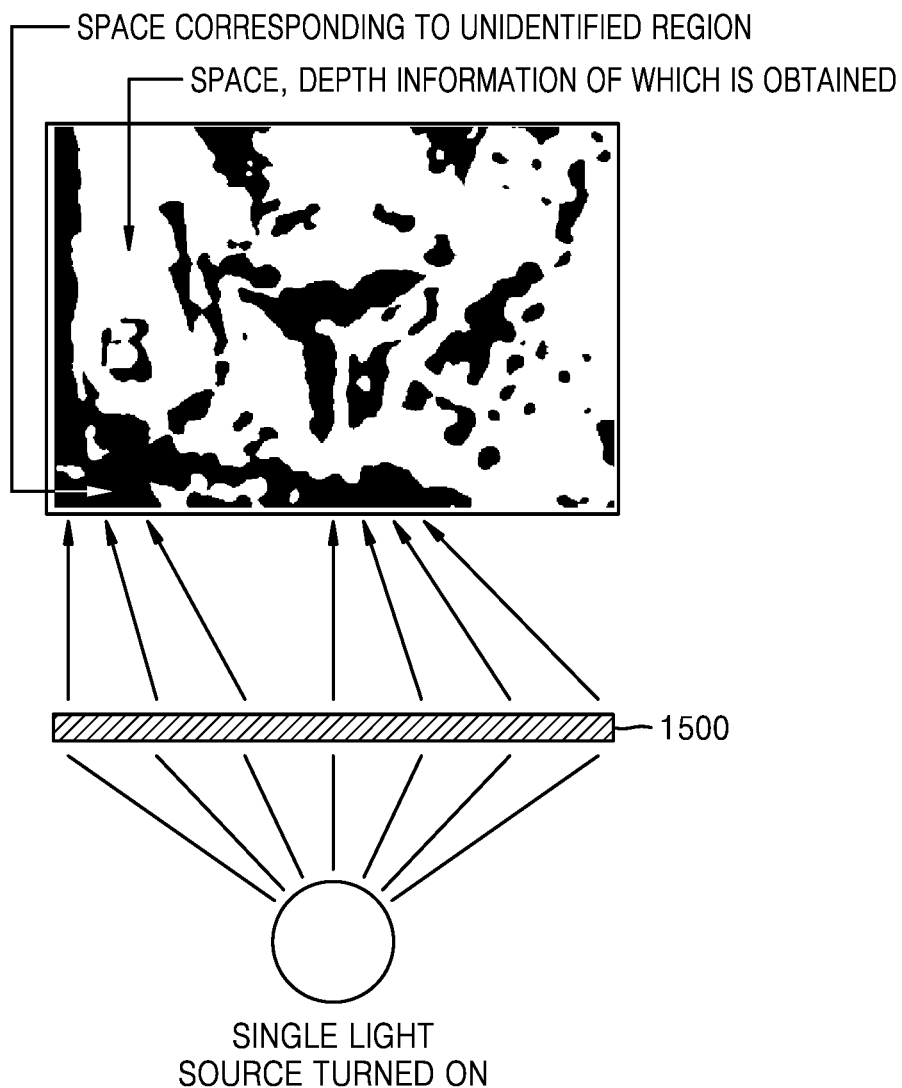
FIG. 6 is a diagram illustrating operations of an active sensor and a mask forming unit in a case where the active sensor of an image generating device includes a single light source, according to an embodiment of the disclosure.

FIG. 6 is a diagram illustrating operations of the active sensor 1400 and the mask forming unit 1500 in the case where the active sensor 1400 of the image generating device 1000 includes a single light source, according to an embodiment of the disclosure.

In the case where the active sensor 1400 includes the single light source, the processor 1200 of the image generating device 1000 may control the mask forming unit 1500 such that light emitted from the single light source is integrated into the space corresponding to the unidentified region. Referring to FIG. 6, the mask forming unit 1500 of the image generating device 1000 may adjust the direction of the light emitted from the single light source of the active sensor 1400, to integrate the light into the space corresponding to the unidentified region where the depth information is unknown, excluding spaces, the depth information of which is obtained. Due to the integration of light, the efficiency of the active sensor 1400 may increase.

Figure 7:
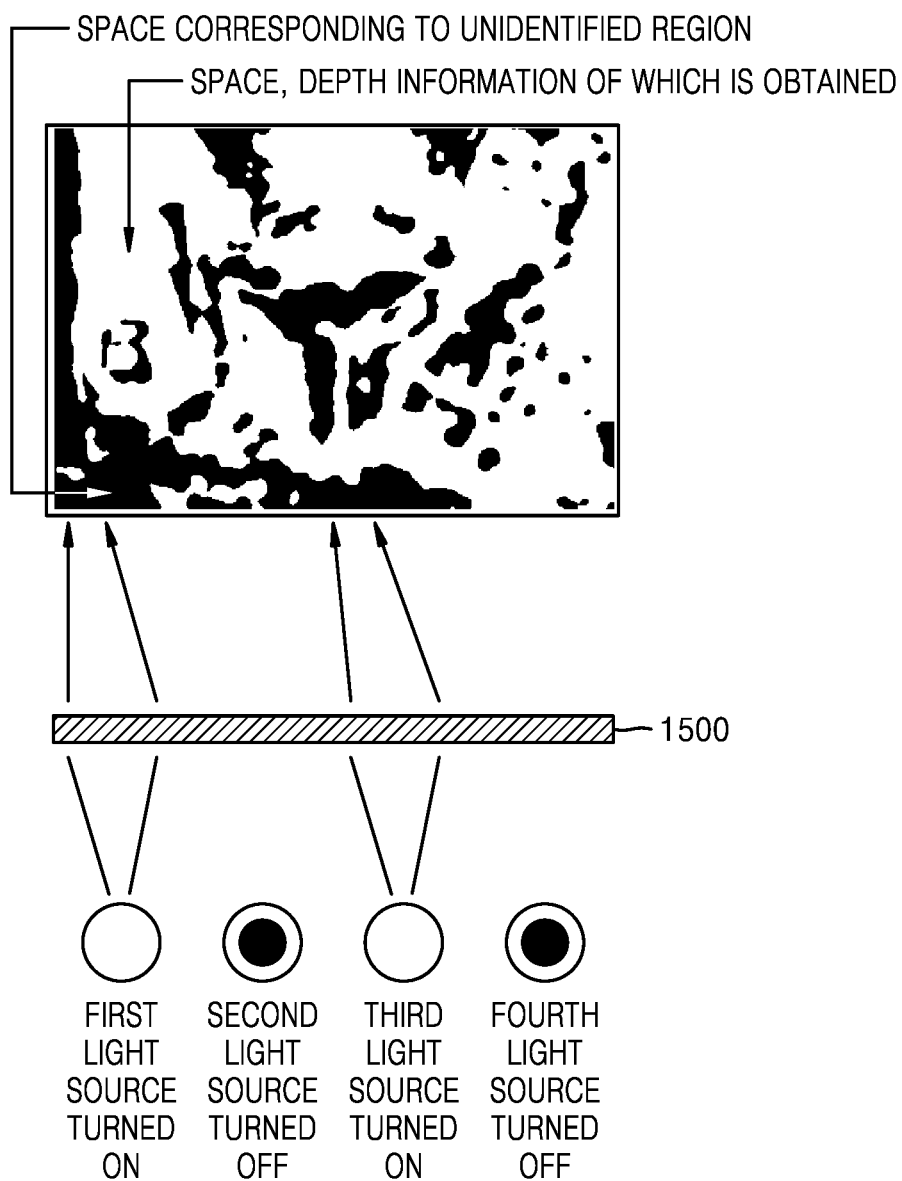
FIG. 7 is a diagram illustrating operations of an active sensor and a mask forming unit in a case where the active sensor of an image generating device includes a plurality of light sources, according to an embodiment of the disclosure.

FIG. 7 is a diagram illustrating operations of the active sensor 1400 and the mask forming unit 1500 in the case where the active sensor 1400 of the image generating device 1000 includes a plurality of light sources, according to an embodiment of the disclosure.

In the case where the active sensor 1400 includes the plurality of light sources, the processor 1200 of the image generating device 1000 may control the active sensor 1400 to enable a light source for the space corresponding to the unidentified region, and disable a light source for a space corresponding to a region other than the unidentified region in the first depth map, and may control the mask forming unit 1500 to pass light emitted from the enabled light source. Referring to FIG. 7, the image generating device 1000 may control the active sensor 1400 to enable some (first to third light sources) of the plurality of light sources (first to fourth light sources) of the active sensor 1400, for the space corresponding to the unidentified region, and disable the other light sources (second and third light sources). The image generating device 1000 may control corresponding optical elements of the mask forming unit 1500 to pass light emitted from the first light source and the third light source. In this case, by operating some light sources for the space corresponding to the unidentified region, rather than all of the plurality of light sources, the power consumption may be reduced.

Referring again to FIG. 3, according to the above-described configuration, the processor 1200 may execute the instructions stored in the memory 1100 to generate the first depth map with respect to the space by using the passive sensor 1300, and identify the unidentified region of the first depth map. The processor 1200 may execute the instructions stored in the memory 1100 to generate the second depth map with respect to the unidentified region by using the mask forming unit 1500 to form the mask based on the unidentified region, and the active sensor 1400. The processor 1200 may execute the instructions stored in the memory 1100 to generate the third depth map with respect to the space based on the first depth map and the second depth map.

Specifically, the processor 1200 may execute at least one of the sensing module, the image analysis module, the mask forming module, or the image generating module stored in the memory 1100 to generate a depth map with respect to the space in order to model a three-dimensional space.

The processor 1200 may load and execute the instructions or the software module stored in the memory 1100. The processor 1200 may include at least one processing hardware module to execute at least one of the sensing module, the image analysis module, the mask forming module, or the image generating module stored in the memory 1100. For example, the processor 1200 may include a CPU and a GPU dedicated to image processing, and may execute the sensing module and the mask forming module in the CPU and execute the image analysis module and the image generating module in the GPU. For another example, the processor 1200 may be in the form of one integrated processor that executes all of the sensing module, the image analysis module, the mask forming module, and the image generating module, or may include individual processors that execute the respective modules.

The processor 1200 may execute the sensing module to transmit a sensing control signal to the passive sensor 1300 and the active sensor 1400. Data obtained by using the passive sensor 1300 and the active sensor 1400 may be stored in the memory 1100. The data stored in the memory 1100 may be used to generate the first to third depth maps.

The processor 1200 may execute the image analysis module to identify the unidentified region of the first depth map. The processor 1200 may identify the unidentified region of the first depth map by defining, in the first depth map, a region, depth information of which is unknown or the accuracy of the depth information is less than or equal to the preset level, as the unidentified region. The processor 1200 may identify the unidentified region of the first depth map to determine which portion may be supplemented in the first depth map.

The processor 1200 may execute the mask forming module to form the mask based on the unidentified region of the first depth map. The processor 1200 may control the mask forming unit 1500 to form the mask based on the unidentified region according to the image obtained by projecting the first depth map onto the light-emitting surface of the active sensor 1400.

The processor 1200 may execute the image generating module to generate the first depth map from data obtained by using the passive sensor 1300, and generate the second depth map with respect to the unidentified region of the first depth map from data obtained by using the active sensor 1400. The processor 1200 may execute the image generating module to generate the third depth map based on the first depth map and the second depth map. The processor 1200 may generate the third depth map by performing image correction on the unidentified region in the first depth map by using the second depth map. The third depth map may be a depth map in which the unidentified region in the first depth map is corrected by using the second depth map. The processor 1200 may store the generated third depth map in the memory 1100.

Figure 8:
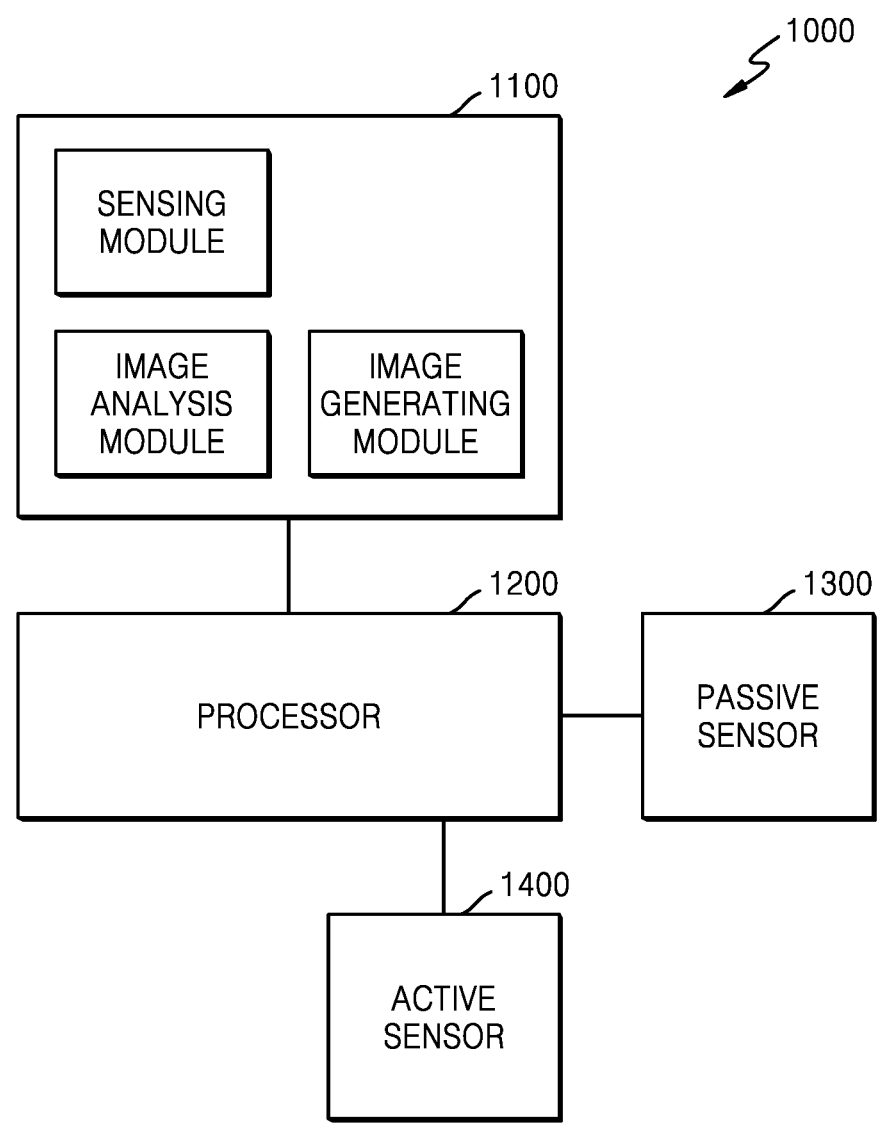
FIG. 8 is a diagram illustrating a configuration and an operation of an image generating device, according to another embodiment of the disclosure.

FIG. 8 is a diagram illustrating a configuration and an operation of the image generating device 1000, according to another embodiment of the disclosure.

Compared to the embodiment described with reference to FIG. 3, the image generating device 1000 of FIG. 8 does not include the mask forming unit 1500, and accordingly, the mask forming module is not stored in the memory 1100. For the memory 1100, the processor 1200, the passive sensor 1300, and the active sensor 1400, the same descriptions as those given with reference to FIG. 3 will be omitted.

According to the embodiment of FIG. 8, the processor 1200 may execute the instructions stored in the memory 1100 to generate the first depth map with respect to the space by using the passive sensor 1300, and identify the unidentified region of the first depth map. The processor 1200 may execute the instructions stored in the memory 1100 to generate the second depth map with respect to the unidentified region of the first depth map by using the active sensor 1400. The processor 1200 may execute the instructions stored in the memory 1100 to generate the third depth map with respect to the space based on the first depth map and the second depth map.

Specifically, the processor 1200 may execute at least one of the sensing module, the image analysis module, or the image generating module stored in the memory 1100 to generate a depth map with respect to the space in order to model a three-dimensional space.

The processor 1200 may execute the sensing module to transmit a sensing control signal to the passive sensor 1300 and the active sensor 1400. Data obtained by using the passive sensor 1300 and the active sensor 1400 may be stored in the memory 1100. The data obtained by using the active sensor 1400 in the embodiment of FIG. 3 may be data regarding the space corresponding to the unidentified region, whereas the data obtained by using the active sensor 1400 in the embodiment of FIG. 8 may be data regarding the entire space. This is because the mask that blocks part of the light emitted from the light source of the active sensor 1400 is not used in the embodiment of FIG. 8. The data stored in the memory 1100 may be used to generate the first to third depth maps.

The processor 1200 may execute the image analysis module to identify the unidentified region of the first depth map. The processor 1200 may identify the unidentified region of the first depth map by defining, in the first depth map, a region where the depth information is unknown or the accuracy of the depth information is less than or equal to the preset level, as the unidentified region. The processor 1200 may divide the first depth map into a plurality of regions based on the depth information. The processor 1200 may store, in the memory 1100, position information of the unidentified region among the plurality of regions divided from the first depth map, and use the position information to generate the second depth map or the third depth map.

The processor 1200 may execute the image generating module to generate the first depth map from the data obtained by using the passive sensor 1300, and generate the second depth map with respect to the unidentified region of the first depth map from the data obtained by using the active sensor 1400. The processor 1200 may generate the second depth map from the data obtained by using the active sensor 1400 based on the position information of the unidentified region of the first depth map stored in the memory 1100. In this case, a depth information generation algorithm having performance corresponding to the size of the unidentified region of the first depth map may be applied to the data obtained by using the active sensor 1400. In addition, in the case where a plurality of unidentified regions are present in the first depth map, different depth information generation algorithms may be applied to the data obtained by using the active sensor 1400 according to the size of the unidentified region. A high-quality depth information generation algorithm requires a long computing time, and thus the quality of the depth information generation algorithm may be in inverse proportion to the size of the unidentified region of the first depth map. The processor 1200 may generate the third depth map based on the first depth map and the second depth map.

Figure 9:
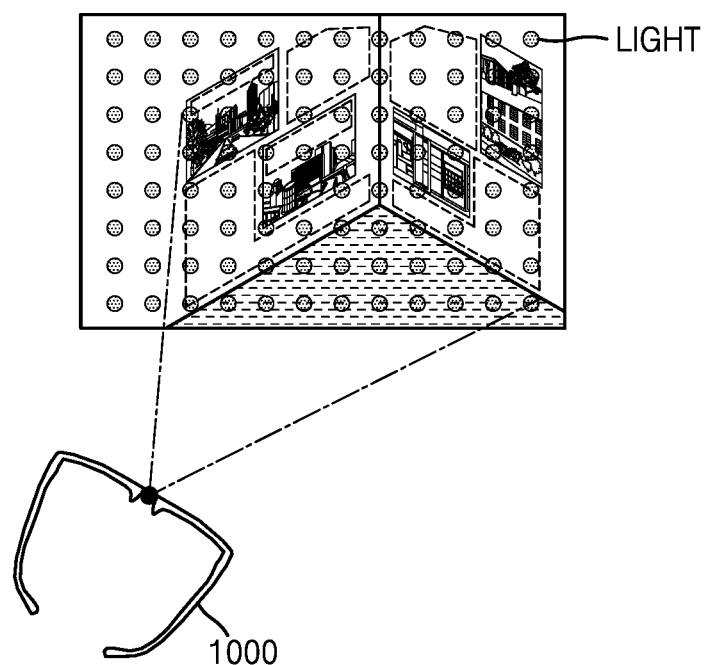
FIG. 9 is a diagram illustrating a process of generating, by an image generating device, a second depth map with respect to an unidentified region, according to another embodiment of the disclosure.

FIG. 9 is a diagram illustrating a process of generating, by the image generating device 1000, the second depth map with respect to the unidentified region, according to another embodiment of the disclosure.

The image generating device 1000 may generate the second depth map with respect to the unidentified region of the first depth map by using the active sensor 1400. Because the image generating device 1000 has identified the unidentified regions of the first depth map and has been storing the information about the identified unidentified regions in the memory 1100, the image generating device 1000 may generate the second depth map with respect to the unidentified regions based on the stored information.

Referring to FIG. 9, the image generating device 1000 may project the light emitted from the light source of the active sensor 1400 to the entire space. Although FIG. 9 illustrates that dot-patterned light is projected to the entire space, the pattern or type of the emitted light is not limited thereto. The image generating device 1000 may actively emit the light to the entire space by using the active sensor 1400, and may detect reflected light that is reflected from the subject and then received by the active sensor 1400. The image generating device 1000 may use the active sensor 1400 capable of obtaining depth information by emitting a laser or an infrared ray to the entire space and calculating a time taken by the laser or infrared ray to be returned, or by emitting certain patterned light to the entire space and measuring the size or shape of an image formed at the corresponding space. The image generating device 1000 may obtain the depth information regarding the entire space by using the active sensor 1400, and then generate the second depth map with respect to the unidentified region based on information about the unidentified region of the first depth map.

Figure 10:
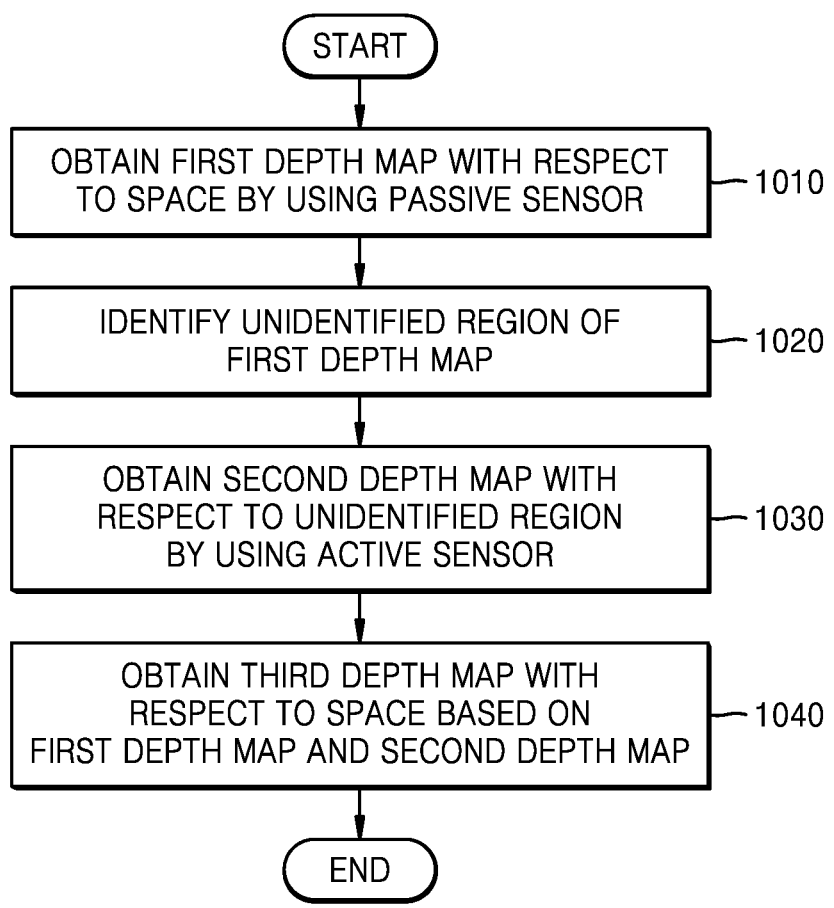
FIG. 10 is a flowchart of a method of generating an image, according to embodiments of the disclosure.

FIG. 10 is a flowchart of a method of generating an image, according to embodiments of the disclosure.

The description of the image generating device 1000 given above may be applied to the method of generating an image even if the description thereof is omitted.

In operation 1010, the image generating device 1000 may obtain the first depth map with respect to the space by using the passive sensor 1300.

In operation 1020, the image generating device 1000 may identify the unidentified region of the first depth map. The processor 1200 may identify the unidentified region of the first depth map by defining, in the first depth map, a region where the depth information is unknown or the accuracy of the depth information is less than or equal to the preset level, as the unidentified region.

In operation 1030, the image generating device 1000 may obtain the second depth map with respect to the unidentified region by using the active sensor 1400.

For example, the image generating device 1000 may obtain the second depth map with respect to the unidentified region by using the active sensor 1400 and the mask forming unit 1500 to form the mask based on the unidentified region.

The image generating device 1000 may selectively control the plurality of optical elements included in the mask forming unit 1500 to pass or block the light emitted from the light source of the active sensor 1400, so as to project the light emitted from the light source of the active sensor 1400 to the space corresponding to the unidentified region. The image generating device 1000 may control the optical element corresponding to the unidentified region to pass the emitted light, and control the optical element corresponding to the region other than the unidentified region in the first depth map to block the emitted light. The image generating device 1000 may control the optical element corresponding to the unidentified region to form the unmasked region, and control the optical element corresponding to the region other than the unidentified region in the first depth map to form the masked region. The image generating device 1000 may selectively control the plurality of optical elements by controlling each optical element so that the light, emitted from the light source of the active sensor 1400, that passes through or is blocked by the each optical element is projected to the space corresponding to the unidentified region of the first depth map. The image generating device 1000 may selectively control the plurality of optical elements to form the mask based on the unidentified region according to the image obtained by projecting the first depth map onto the light-emitting surface of the active sensor 1400.

In the case where the active sensor 1400 includes a single light source, the image generating device 1000 may selectively control the plurality of optical elements such that light emitted from the single light source is integrated into the space corresponding to the unidentified region. In the case where the active sensor 1400 includes a plurality of light sources, the image generating device 1000 may control the active sensor 1400 to enable a light source for the space corresponding to the unidentified region and disable a light source for the space corresponding to the region other than the unidentified region in the first depth map. The image generating device 1000 may control some of the plurality of optical elements included in the mask forming unit 1500 to pass light emitted from the enabled light source.

The image generating device 1000 may generate the second depth map with respect to the unidentified region based on the data obtained from the active sensor 1400.

For another example, the image generating device 1000 may generate the second depth map with respect to the unidentified region by using the active sensor 1400. The image generating device 1000 may project the light emitted from the light source of the active sensor 1400 to the entire space to obtain information regarding the entire space, and then generate the second depth map with respect to the unidentified region based on the information regarding the unidentified region of the first depth map. In this case, a depth information generation algorithm having performance corresponding to the size of the unidentified region of the first depth map may be applied to the data obtained by using the active sensor 1400. In addition, in the case where a plurality of unidentified regions are present in the first depth map, different depth information generation algorithms may be applied to the data obtained by using the active sensor 1400 according to the size of the unidentified region.

In operation 1040, the image generating device 1000 may obtain the third depth map with respect to the space based on the first depth map and the second depth map. The image generating device 1000 may generate the third depth map by performing image correction on the unidentified region in the first depth map by using the second depth map. The third depth map may be a depth map in which the unidentified region in the first depth map is corrected by using the second depth map.

Figure 11:
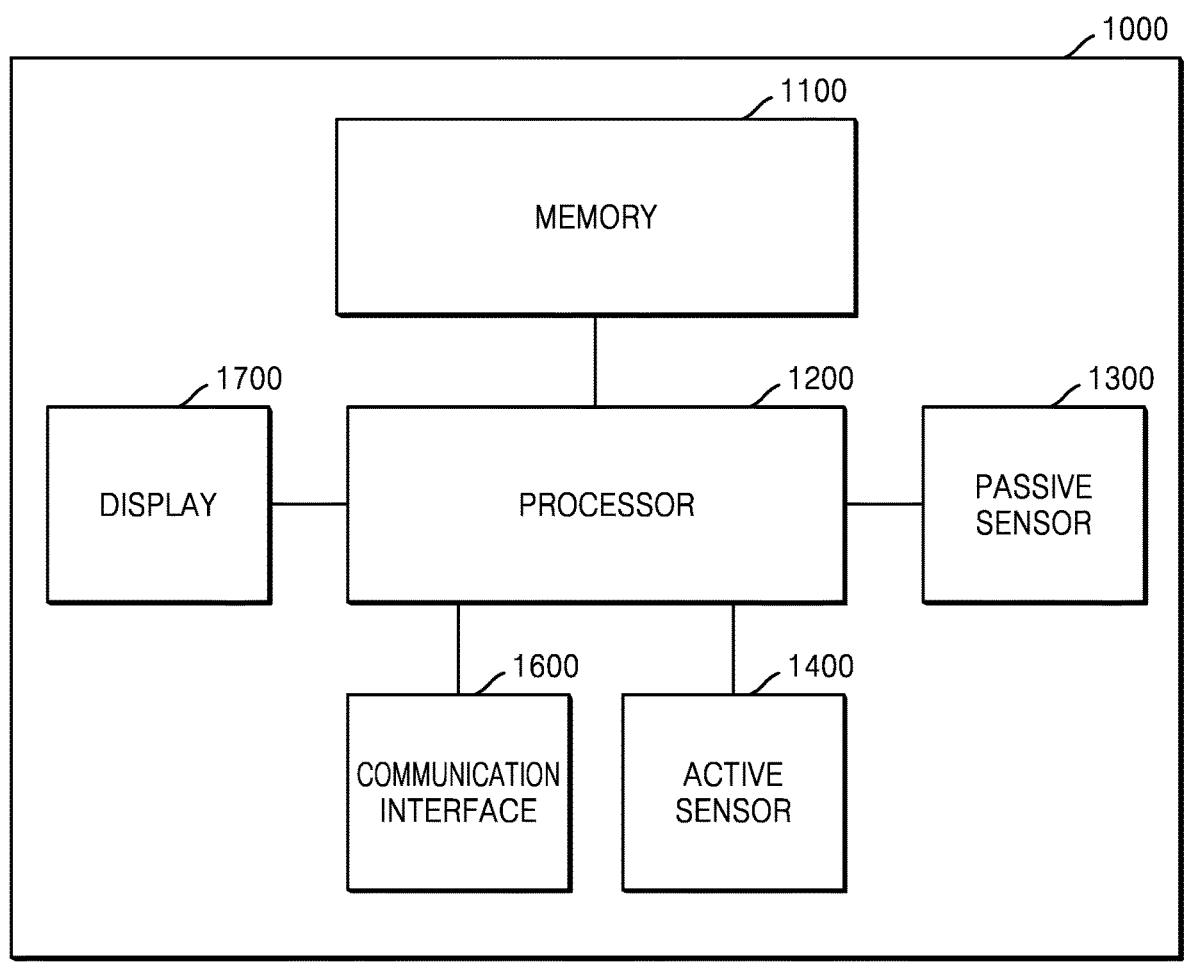
FIG. 11 is a diagram illustrating an example of an image generating device, according to embodiments of the disclosure.

FIG. 11 is a diagram illustrating an example of the image generating device 1000, according to embodiments of the disclosure.

FIG. 11 illustrates a case where the image generating device 1000 is a smart phone or a digital camera. The image generating device 1000 may further include a communication interface 1600 and a display 1700 in addition to the memory 1100, the processor 1200, the passive sensor 1300, and the active sensor 1400 described above. In addition, the image generating device 1000 may also include components such as the mask forming unit 1500, a position sensor for detecting the position of the image generating device 1000, or a power supply unit for supplying power to the image generating device 1000, but descriptions thereof will be omitted.

The communication interface 1600 may perform wired/wireless communication with another device or a network. To this end, the communication interface 1600 may include a communication module that supports at least one of various wired/wireless communication methods. For example, the communication interface 1600 may include a communication module for performing short-range communication such as Wireless Fidelity (Wi-Fi) or Bluetooth, various types of mobile communication, or ultra-wideband communication. The communication interface 1600 may be connected to a device outside the image generating device 1000 which is a smart phone, and transmit an image obtained or generated by the image generating device 1000 to the device.

The display 1700 may include an output unit for providing information or an image, and may further include an input unit for receiving an input. The output unit may include a display panel and a controller for controlling the display panel, and may be implemented in various schemes such as an organic light-emitting diode (OLED) display, an active-matrix organic light-emitting Diode (AM-OLED) display, or a liquid crystal display (LCD). The input unit may receive various types of inputs from a user, and may include at least one of a touch panel, a keypad, or a pen recognition panel. The display 1700 may be provided in the form of a touch screen in which a display panel and a touch panel are combined with each other, and may be implemented to be flexible or foldable.

Figure 12:
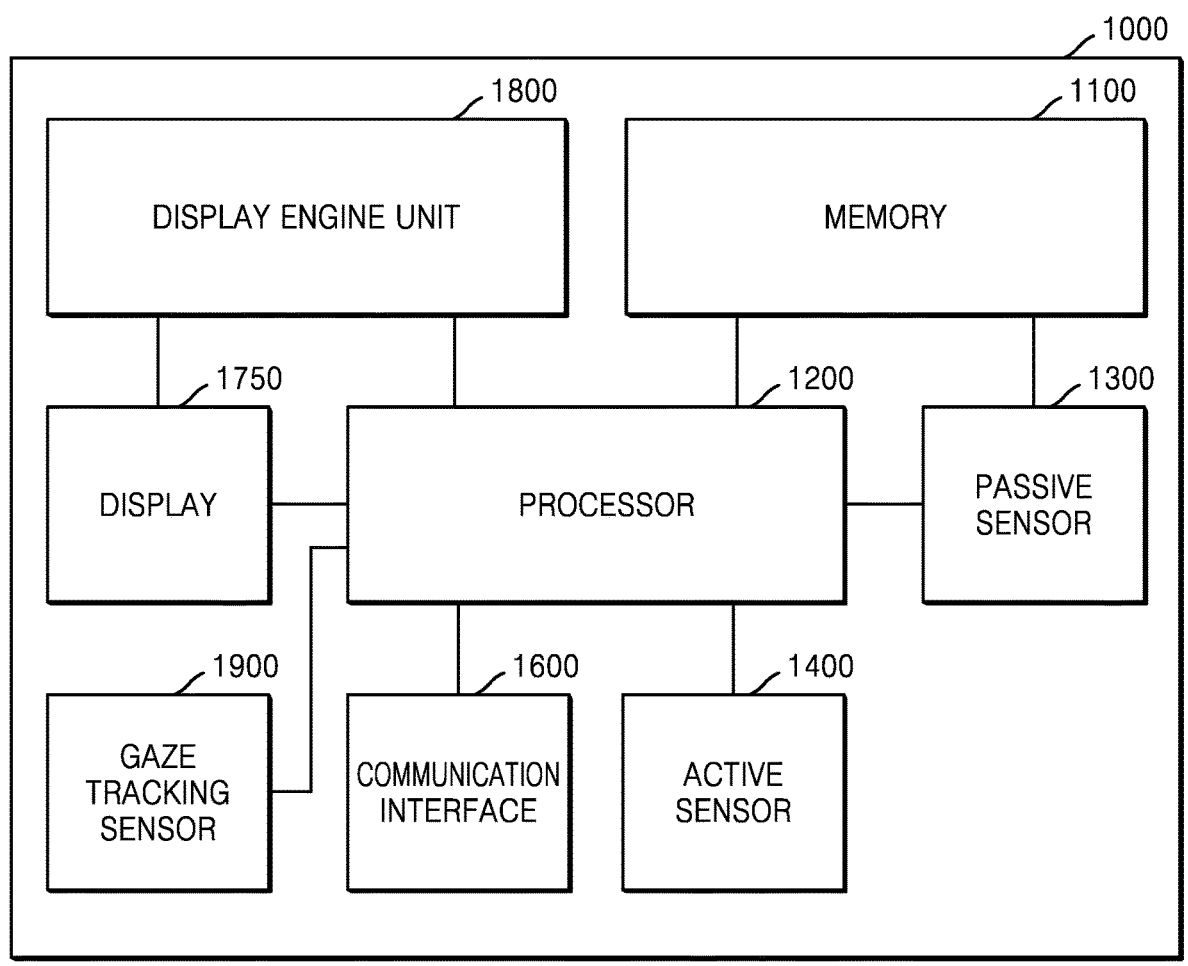
FIG. 12 is a diagram illustrating another example of an image generating device, according to embodiments of the disclosure.

FIG. 12 is a diagram illustrating another example of the image generating device 1000, according to embodiments of the disclosure.

FIG. 12 illustrates a case where the image generating device 1000 is an augmented reality device. The image generating device 1000 may further include the communication interface 1600, a display 1750, a display engine unit 1800, and a gaze tracking sensor 1900 in addition to the memory 1100, the processor 1200, the passive sensor 1300, and the active sensor 1400 described above. In addition, the image generating device 1000 may also include components such as the mask forming unit 1500, a position sensor for detecting the position of the image generating device 1000, or a power supply unit for supplying power to the image generating device 1000, but descriptions thereof will be omitted.

The communication interface 1600 may perform wired/wireless communication with another device or a network. To this end, the communication interface 1600 may support at least one of various wired/wireless communication methods. For example, the communication interface 1600 may perform short-range communication such as Wi-Fi or Bluetooth, various types of mobile communication, or ultra-wideband communication. The communication interface 1600 may be connected to a device outside the image generating device 1000 which is an augmented reality device, and transmit an image obtained or generated by the image generating device 1000 to the device.

The image generating device 1000, which is an augmented reality device, may provide a pop-up of a virtual image by using the display 1750 and the display engine unit 1800. The virtual image may be an image generated by using an optical engine and may include both a static image and a dynamic image. The virtual image may be observed with a real-world scene that the user is viewing through the augmented reality device, and may be an image showing information about a real object in the real-world scene, information about an operation of the image generating device 1000 which is the augmented reality device, a control menu, or the like.

The display engine unit 1800 may include an optical engine for generating and projecting a virtual image and a guide unit for guiding light of a virtual image projected from the optical engine to the display 1750. The display 1750 may include a see-through light guide plate (waveguide) included in the left-eye lens unit and/or the right-eye lens unit of the image generating device 1000 which is the augmented reality device. The display 1750 may display a virtual image showing information about an object, information about an operation of the image generating device 1000 or a control menu.

When the pop-up of the virtual image is displayed on the display 1750, the user wearing the image generating device 1000 which is the augmented reality device may expose his/her hand to the passive sensor 1300 to manipulate the pop-up of the virtual image, and select a function of the image generating device 1000 shown in the pop-up of the virtual image by using the exposed hand to execute the corresponding function.

The gaze tracking sensor 1900 may detect gaze information such as a gaze direction in which the user's eye is directed, a pupil position of the user's eye, or coordinates of the center point of a pupil. The processor 1200 may determine an eye movement profile based on the gaze information of the user detected by the gaze tracking sensor 1900. For example, the processor 1200 may determine various types of gaze movements, including fixation of staring at one point, pursuit of tracking a moving object, and saccade of quickly moving an eye to look at another point.

The processor 1200 of the image generating device 1000 may determine a gaze point of the user or a gaze movement of the user by using the gaze tracking sensor 1900, and use the determined gaze point or gaze movement to control the image generating device 1000. The processor 1200 may obtain at least one image by controlling the direction of the passive sensor 1300 or the active sensor 1400 according to the gaze point or the gaze movement determined by the gaze tracking sensor 1900. For example, the user may wear the image generating device 1000 which is the augmented reality device, to obtain a first image in a first direction, and then control the direction of the passive sensor 1300 according to a gaze point or gaze movement of the user to obtain a second image in a second direction.

The image generating device 1000 described in the disclosure may be implemented as a hardware component, a software component, and/or a combination of a hardware component and a software component. For example, the image generating device 1000 described in the embodiments of the disclosure may be implemented by using one or more general-purpose computers or special-purpose computers, such as a processor, an arithmetic logic unit (ALU), an ASIC, a DSP, a DSPD, a PLD, a microcomputer, a microprocessor, or any other device capable of executing and responding to instructions.

The software may include a computer program, code, instructions, or a combination of one or more thereof, and may configure a processing device to operate as desired or may independently or collectively instruct the processing device.

The software may be implemented as a computer program including instructions stored in a computer-readable storage medium. Examples of a computer-readable recording medium include a magnetic storage medium (e.g., a ROM, a RAM, a floppy disk, a hard disk, etc.) and an optical recording medium (e.g., a CD-ROM, a digital versatile disc (DVD), etc.). The computer-readable recording medium may be distributed over networked computer systems such that computer-readable code is stored and executed in a distributed manner. The medium may be readable by a computer, stored in a memory, and executed by a processor.

The computer may invoke stored instructions from the storage medium and operate according to the disclosed embodiment based on the invoked instructions, and may include the image generating device 1000 according to the embodiments of the disclosure.

A computer-readable storage medium may be provided in the form of a non-transitory storage medium. The term 'non-transitory' merely means that the storage medium does not include a signal but is tangible, and does not distinguish whether data is stored semi-permanently or temporarily on the storage medium.

In addition, the methods according to various embodiments disclosed herein may be provided in a computer program product. The computer program product may be traded between a seller and a purchaser as a commodity.

The computer program product may include a software program and a computer-readable storage medium having recorded thereon the software program. For example, the computer program product may include a product (e.g., a downloadable application) in the form of a software program electronically distributed through a manufacturer of the image generating device 1000 or an electronic market (e.g., Google Play Store, App Store). For the electronic distribution, at least part of the software program may be stored in a storage medium or temporarily generated. In this case, the storage medium may be a storage medium of a server of the manufacturer or the electronic market, or a relay server that temporarily stores the software program.

The computer program product may include a storage medium of a server or a storage medium of a terminal, in a system consisting of the server and the terminal (e.g., the image generating device). Alternatively, when there is a third device (e.g., a smart phone) communicating with the server or the terminal, the computer program product may include a storage medium of the third device. Alternatively, the computer program product may include the software program itself, which is transmitted from the server to the terminal or the third device or transmitted from the third device to the terminal.

In this case, one of the server, the terminal, and the third device may execute the computer program product to perform the method according to the embodiments of the disclosure. Alternatively, two or more of the server, the terminal, and the third device may execute the computer program product to execute the method according to the embodiments of the disclosure in a distributed manner.

For example, a server (e.g., a cloud server or an artificial intelligence server, etc.) may execute a computer program product stored in the server to control the terminal communicating with the server to perform the method according to the embodiments of the disclosure.

For another example, the third device may execute the computer program product to control the terminal communicated with the third device to perform the method according to the embodiments disclosed herein.

In the case where the third device executes the computer program product, the third device may download the computer program product from the server and execute the downloaded computer program product. Alternatively, the third device may execute the computer program product provided in a preloaded state to execute the method according to the embodiments disclosed herein.

Although the embodiments of the disclosure have been described with reference to the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

The invention claimed is:

1. An image generating device comprising:
a passive sensor;
an active sensor;
a mask forming unit;
a memory storing instructions; and
a processor configured to execute the instructions to:
   obtain a first depth map with respect to a first space by using the passive sensor,
   identify an unidentified region of the first depth map,
   obtain a second depth map with respect to the unidentified region by using the active sensor and the mask forming unit configured to form a mask based on the unidentified region, and
   obtain a third depth map with respect to the first space based on the first depth map and the second depth map.

2. The image generating device of claim 1, wherein the mask forming unit comprises a plurality of optical elements which are configured to selectively operate to pass or block light emitted from a light source of the active sensor, to project the emitted light to a second space corresponding to the unidentified region.

3. The image generating device of claim 2, wherein the mask forming unit is configured to operate so that an optical element corresponding to the unidentified region passes the emitted light, and an optical element corresponding to a region other than the unidentified region in the first depth map blocks the emitted light.

4. The image generating device of claim 2, wherein the mask forming unit is configured to operate so that an optical element corresponding to the unidentified region forms an unmasked region, and an optical element corresponding to a region other than the unidentified region in the first depth map forms a masked region.

5. The image generating device of claim 2, wherein each optical element of the plurality of optical elements is configured to be controlled so that the emitted light that passes through or is blocked by the each optical element is projected to the second space corresponding to the unidentified region.

6. The image generating device of claim 1, wherein the processor is further configured to execute the instructions to control the mask forming unit to form the mask based on the unidentified region according to an image obtained by projecting the first depth map onto a light-emitting surface of the active sensor.

7. The image generating device of claim 1, wherein the active sensor comprises a single light source, and the processor is further configured to execute the instructions to control the mask forming unit so that light emitted from the single light source is integrated into a second space corresponding to the unidentified region.

8. The image generating device of claim 1, wherein the active sensor comprises a plurality of light sources, and the processor is further configured to execute the instructions to:
control the active sensor to enable a light source for a second space corresponding to the unidentified region, and disable a light source for a third space corresponding to a region other than the unidentified region in the first depth map, and
control the mask forming unit to pass light emitted from the enabled light source.

9. The image generating device of claim 1, wherein the processor is further configured to execute the instructions to obtain the third depth map by performing image correction on the unidentified region in the first depth map by using the second depth map.

10. The image generating device of claim 1, wherein the unidentified region is a region of which depth information is unknown, or a region where an accuracy of depth information is less than or equal to a preset level in the first depth map.

11. A method of generating an image, the method comprising:

obtaining a first depth map with respect to a first space by using a passive sensor;
identifying an unidentified region of the first depth map;
obtaining a second depth map with respect to the unidentified region by using an active sensor and a mask forming unit configured to form a mask based on the unidentified region; and
obtaining a third depth map with respect to the first space based on the first depth map and the second depth map.

12. The method of claim 11, wherein the obtaining the second depth map comprises:

selectively controlling a plurality of optical elements included in the mask forming unit to pass or block light emitted from a light source of the active sensor, thereby projecting the emitted light to a second space corresponding to the unidentified region; and
obtaining the second depth map with respect to the unidentified region based on data obtained from the active sensor.

13. The method of claim 12, wherein selectively controlling the plurality of optical elements comprises:

selectively controlling the plurality of optical elements by controlling each optical element so that the emitted light that passes through or is blocked by the each optical element is projected to the second space corresponding to the unidentified region.

14. The method of claim 12, wherein the selectively controlling the plurality of optical elements comprises controlling the plurality of optical elements to form the mask based on the unidentified region according to an image obtained by projecting the first depth map onto a light-emitting surface of the active sensor.

15. A non-transitory computer-readable recording medium having recorded thereon a program that is executed by a computer to perform a method of generating an image, the method comprising:

obtaining a first depth map with respect to a space by using a passive sensor;
identifying an unidentified region of the first depth map;
obtaining a second depth map with respect to the unidentified region by using an active sensor and a mask forming unit configured to form a mask based on the unidentified region; and
obtaining a third depth map with respect to the space based on the first depth map and the second depth map.

* * * * *